US010764338B2

(12) United States Patent
Ahlawat et al.

(10) Patent No.: US 10,764,338 B2
(45) Date of Patent: Sep. 1, 2020

(54) INTEGRATED VOICE AND DATA COMMUNICATIONS ENVIRONMENT

(71) Applicant: AMERICAN EXPRESS TRAVEL RELATED SERVICES COMPANY, INC., New York, NY (US)

(72) Inventors: Archit Ahlawat, Phoenix, AZ (US); Mark Lawrence, Brighton (GB); Jagadish Shivarudrappa, Brighton (GB); Jiju Soman, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 16/261,119

(22) Filed: Jan. 29, 2019

(65) Prior Publication Data
US 2020/0244713 A1    Jul. 30, 2020

(51) Int. Cl.
*H04L 29/06* (2006.01)
*H04M 3/42* (2006.01)
*H04M 3/51* (2006.01)

(52) U.S. Cl.
CPC .......... *H04L 65/1083* (2013.01); *H04L 69/08* (2013.01); *H04M 3/42042* (2013.01); *H04M 3/5183* (2013.01)

(58) Field of Classification Search
CPC ................ H04L 65/1083; H04L 69/08; H04M 3/42042; H04M 3/5183; H04M 3/561; H04M 3/567; H04M 2203/20; H04M 2203/35
See application file for complete search history.

(56) References Cited

U.S. PATENT DOCUMENTS

| 5,631,958 | A  | * | 5/1997  | Reese    | H04M 3/002  |
|           |    |   |         |          | 379/406.06  |
| 6,560,329 | B1 | * | 5/2003  | Draginich | H04M 3/42314 |
|           |    |   |         |          | 379/142.01  |
| 6,804,256 | B2 | * | 10/2004 | Chang    | H04B 10/272 |
|           |    |   |         |          | 370/412     |
| 6,883,023 | B1 | * | 4/2005  | Wang     | G06F 1/1632 |
|           |    |   |         |          | 709/220     |
| 9,015,297 | B2 | * | 4/2015  | Putman   | H04L 29/06  |
|           |    |   |         |          | 709/203     |

OTHER PUBLICATIONS

Avaya, "ASAI feature", retrieved on Jan. 29, 2019 from https://downloads.avaya.com/elmodocs2/AIR/CDV3/AIR%20Doc%20CD_new/html/2396.htm.

(Continued)

*Primary Examiner* — Sharad Rampuria
(74) *Attorney, Agent, or Firm* — Thomas | Horstemeyer, LLP

(57) ABSTRACT

A system for an integrated voice and data communications environment is disclosed. The system may receive a voice call and assign the voice call to a first communications environment. The system may store call related data from the first communications environment. The system may receive a request for communications transfer and transfer the voice call from the first communications environment to a second communications environment in response to the request. The system may pass the call related data from the first communications environment to the second communications environment.

20 Claims, 7 Drawing Sheets

(56) References Cited

OTHER PUBLICATIONS

Avaya, "Avaya MultiVantageTM, Application Enablement Services, ASAI Protocol Reference" Issue 2, May 2006, Retrieved on Jan. 29, 2019, retrieved from https://downloads.avaya.com/css/P8/documents/100013744.

Cisco, "Enterprise Application Gateway (GED-145)", Retrieved on Jan. 29, 2019, Retrieved from https://d1nmyq4gcgsfi5.cloudfront.net/site/ent-app-gateway/overview/.

Cisco, "Cisco ICM Application Gateway Interface", Published Jul. 18, 2015, by Cisco Systems.

Rosenberg et al. "SIP: Session Initiation Protocol", Published Jun. 2002, Retrieved on Jan. 29, 2019, Retrieved from https://www.ietf.org/rfc/rfc3261.txt.

Stallings, The Session Initiation Protocol, The Internet Protocol Journal, vol. 6, No. 1. Retrieved on Jan. 29, 2019, Retrieved from https://www.cisco.com/c/en/us/about/press/internet-protocol-journal/back-issues/table-contents-23/sip.html.

* cited by examiner

INTEGRATED VOICE AND DATA COMMUNICATIONS ENVIRONMENT

FIELD

The present disclosure generally relates to systems and methods for passing voice and data across communication environments.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. However, traditional relational databases may not be capable of sufficiently handling the size of the tables that big data creates.

As a result, the massive amounts of data in big data sets may be stored in numerous different data storage formats in various locations to service diverse application parameters and use case parameters. Data variables resulting from complex data transformations may be central to deriving valuable insight from data driven operation pipelines. Additionally, insights may be gained from functional linkages between operational data. Many of the various data storage formats use transformations to convert input data into output variables. These transformations are typically hard coded into systems and may be system specific and/or definitive of a systems environment. As a result, transferring data between differing data environments may be difficult and/or time consuming.

SUMMARY

In various embodiments, systems, methods, and articles of manufacture (collectively, the "system") for an integrated voice and data communications environment are disclosed. In various embodiments, the system may receive a voice call and assign the voice call to a first communications environment. The system may store call related data from the first communications environment. The system may receive a request for communications transfer and transfer the voice call from the first communications environment to a second communications environment in response to the request. The system may pass the call related data from the first communications environment to the second communications environment.

In various embodiments, the system may generate a unique ID in response to the request for communications transfer. The system may associate the unique ID with the call related to data to generate an associated data. The system may pass the unique ID from the first communications environment to the second communications environment. In various embodiments, the system may insert the unique ID into a user to user information header. The system may pass the user to user information header from the first communications environment to the second communications environment. The system may strip the unique ID from the user to user information header and may recall the associated data based on the unique ID.

In various embodiments, the system may generate a data populated call request based on the associated data. The system may assign the data populated call request to an agent terminal of the second communications environment and may display a data of the data populated call request via the agent terminal. In various embodiments, the first communications environment is configured to pass the user to user information via a first protocol and the second communications environment is configured to pass the user to user information via a second protocol. In various embodiments, the system may suffix a random number with a target indicator to generate the unique ID. The system may convert the user to user information from the second protocol in decimal form to the first protocol in hexadecimal form with delimiters. In various embodiments, the first protocol is the session initiation protocol and the second protocol is one of the adjunct switch application interface protocol or GED-145 protocol (the GED protocols identify protocols associated with Cisco® enterprise application gateway).

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
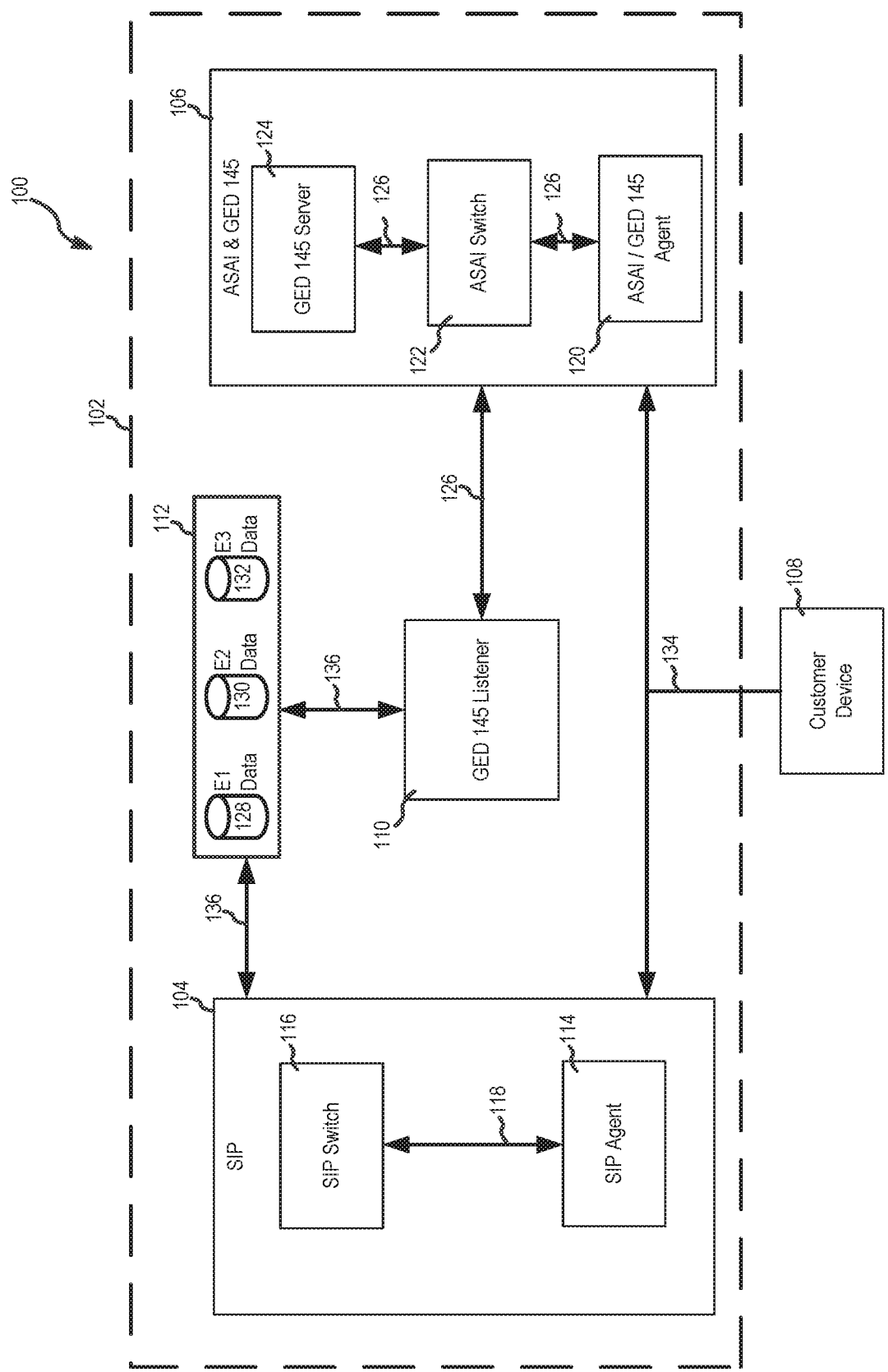
FIG. 1 is a block diagram illustrating various system components of an integrated voice and data communications environment, in accordance with various embodiments.

The system may provide a greater level of sophistication and/or control for big data systems. For example, communications metadata may be gathered by a data environment, but the metadata may be unable to pass between dissimilar environments. In this regard, relationships between records of interest may be 'hidden' by an inability to link or transfer records between the multiple systems. While prior art systems typically often demand re-entry, regathering, and/or reformatting of data, the current system may define direct links between relating records of interest based on existing record elements. As such, the system may eliminate or reduce gaps, along with reducing re-entry of data and reducing record duplication. The system may pass the direct links between hardcoded protocols of the respective communications environment. In this regard, the system may also reduce the cost of development or system processing time for data entry, reduce network utilization, and/or reduce data storage overhead. The system may increase data reliability or accuracy by enabling traceability of data between environments. The system may also reduce redundant input requests, thereby reducing a demand for system resources. The system may simplify data mining and enhance user experience by decreasing the number of user interactions (e.g., duplicate entry requests). Benefits of the present disclosure may apply to any suitable integrated data environment. For example, the present disclosure may apply in dispute contexts, as well as in information requests or support contexts.

This process improves the functioning of the computer. For example, decreasing parallel recordkeeping in dissimilar data environments improves storage capacity. Similarly, the process increases the reliability and speed of data presentation by enabling direct transport of real time data between environments on the basis of existing elements. For example, average handling times may be reduce due to increased data availability across environments. In various embodiments, a one-to-one tie is enabled between the customer and the data generated by a communications environment that increases the reliability and speed of analysis. In this regard, by transmitting, storing, and/or accessing data using the processes described herein, the security of the data is improved and errors are reduced. For example, duplication errors may be reduced by elimination of environment specific data entry (i.e., re-entry for each environment). Such improvements also increase the efficiency of the network by reducing the portion of dropped channels. In various embodiments, linking and storing processes significantly reduce back end processing and reduce processing time for determining relationships between transaction accounts and merchants. Probabilistic model processing and correlation of interest may be computationally resource intensive. In this regard, the processes may decrease processing overhead of computing systems comprising multiple communications environments. In various embodiments, the processes may increase network availability by reducing front end and back end process calls. In this regard, the processes may save processing resources including CPU time, memory resources, and/or network resources.

In various embodiments, and with reference to FIG. 1, a system 100 may comprise an issuer system 102, a first communications environment 104, a second communications environment 106, a customer device 108, a listening API 110, and a data translation environment 112. In various embodiments, the first communications environment 104 may further comprise a first agent terminal 114 and a first switch module 116 in communication via first protocol 118. In various embodiments, the second communications environment 106 may comprise a second agent terminal 120, a second switch module 122, and a server module 124 in communication via a second protocol 126. Any of these components may be outsourced and/or be in communication with issuer system 102 via a network.

In various embodiments, a data translation environment 112 may comprise a database including any number of data structures or data elements such as E1 data 128, E2 data 130, and E3 data 132. Customer device 108 may comprise software and/or hardware in communication with issuer system 102 via a network comprising hardware and/or software configured to allow a transaction account owner, a user, and/or the like, access to issuer system 102. Customer device 108 may comprise any suitable device that is configured to allow a user to communicate with a network and issuer system 102. Customer device 108 may include, for example, a personal computer, personal digital assistant, cellular phone, kiosk, and/or the like and may allow a user to transmit voice communications.

Similarly, first agent terminal 114 and second agent terminal 120 may comprise software and/or hardware in communication with issuer system 102 via a network comprising hardware and/or software configured to allow an agent such as a customer service representative, a user, and/or the like, access to issuer system 102 and to data elements of the data translation environment 112. First agent terminal 114 and second agent terminal 120 may comprise any suitable device that is configured to allow an agent to communicate with a network and issuer system 102 and to receive voice communications from customer device 108. In various embodiments, first agent terminal 114 is configured to communicate via the first protocol 118 and second agent terminal 120 is configured to communicate via the second protocol 126. In various embodiments, the first protocol may be Session Initiation Protocol (SIP) and the second protocol may be a GED-145 protocol see, e.g., CISCO ICM APPLICATION GATEWAY INTERFACE, Doc. Rev. 1.2, (2005), SIP: SESSION INITIATION PROTOCOL (2002), by J. Rosenberg et al., available at https://www.ietf.org/rfc/rfc3261.txt, William Stallings, The Session Initiation Protocol, INTERNET PROTOCOL J., Vol. 6. No. 1, March 2003, available at https://www.cisco.com/c/en/us/about/press/internet-protocol-journal/back-issues/table-contents-23/sip.html, each of which is hereby incorporated by reference.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, issuer system 102 may be configured as a central network element or hub to access various systems, engines, and components of system 100. Issuer system 102 may comprise a network, computer-based system, and/or software components configured to provide an access point to various systems, engines, and components. Issuer system 102 may be in operative and/or electronic communication with first communications environment 104, second communications environment 106, data translation environment 112, and listening API 110. In this regard, issuer system 102 may allow communication from customer device 108 and data translation environment 112 to systems, engines, and components of system 100. In various embodiments, issuer system 102 may receive voice data 134 from customer device 108 such as, for example, via a Public Service Telephony Network (PSTN).

In various embodiments, data translation environment 112 may be configured to store and maintain data relating to a user and/or customer (e.g., customer data records), as for example, as a card account number, customer account data, customer identity data, spend data, support ticket data, call related data, and/or the like. In various embodiments, data translation environment 112 may be configured to store and maintain data relating the first communications environment 104, as E1 data 128. For example, E1 data 128 may comprise real time data from the first agent terminal 114, customer device 108, customer data records, and/or the like. In various embodiments, data translation environment 112 may be configured to store and maintain data relating the second communications environment 106, as E2 data 130. For example, E2 data 130 may comprise real time data from the second agent terminal 120, customer device 108, customer data records, and/or the like.

In various embodiments, data translation environment 112 may be configured to generate datalinks between data records and unique identifiers. In various embodiments, data translation environment 112 may be configured to store and maintain data relation to the data translation environment 112 as E3 data 132. For example, E3 data 132 may comprise translation engines, key generation engines, session unique identifiers (i.e. UUI), custom identifiers (i.e., custom ID) datalinks (for example, between E1 data 128 records and E2 data 130 records) and/or the like. Data translation environment 112 may store the E1 data 128, E2 data 130, and/or E3 data 132 using any suitable technique described herein or known in the art. Data translation environment 112 may be in operative and/or electronic communication with the issuer system 102, the first communications environment 104, the second communications environment 106, the listening API 110, and/or customer device 108. In various embodiments, the data translation environment 112 may communicate via a third protocol 136.

Figure 2A:
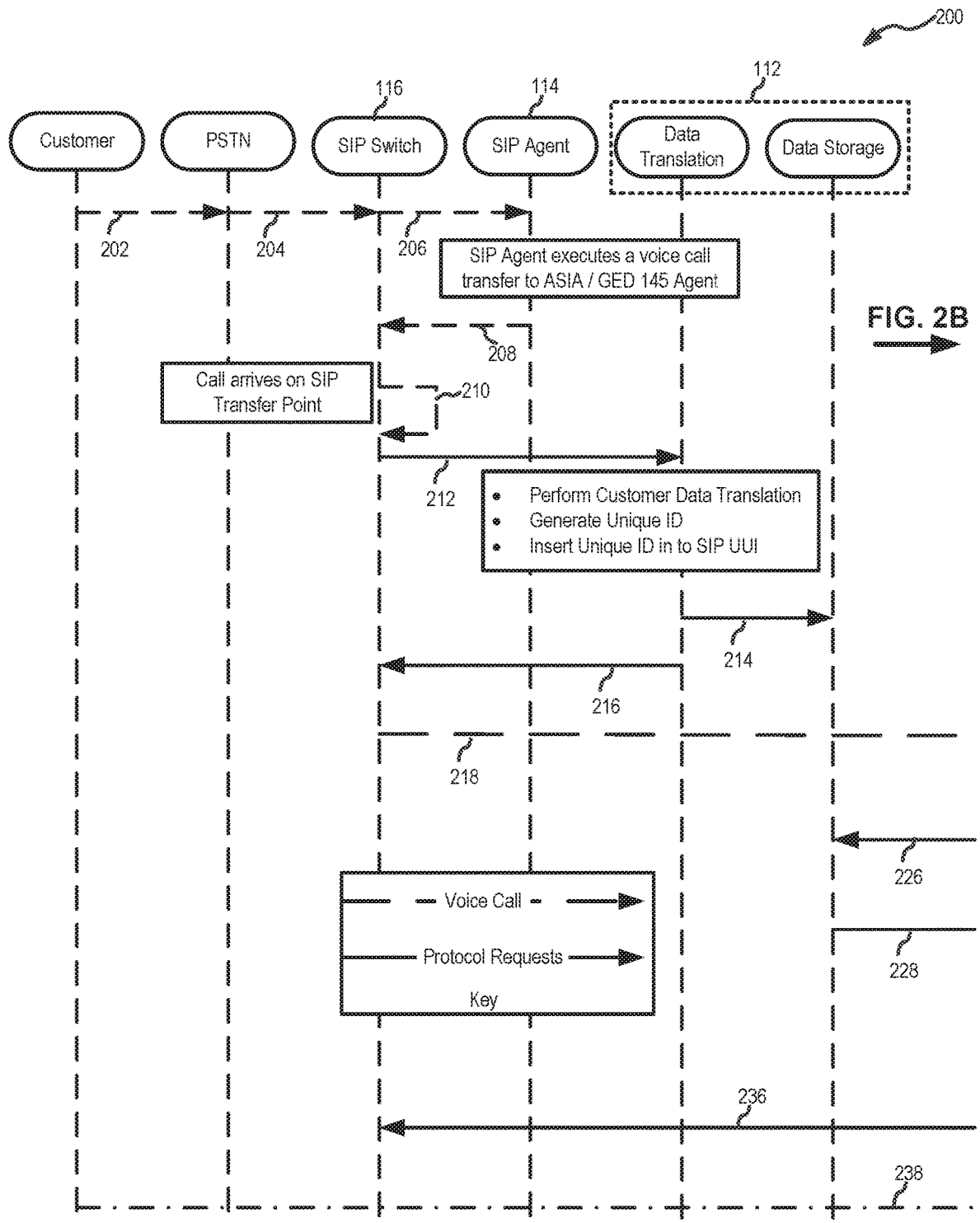
FIG. 2A illustrates a process flow for transferring voice and data communications from a first communications environment to a second communications environment, in accordance with various embodiments.
Figure 2B:
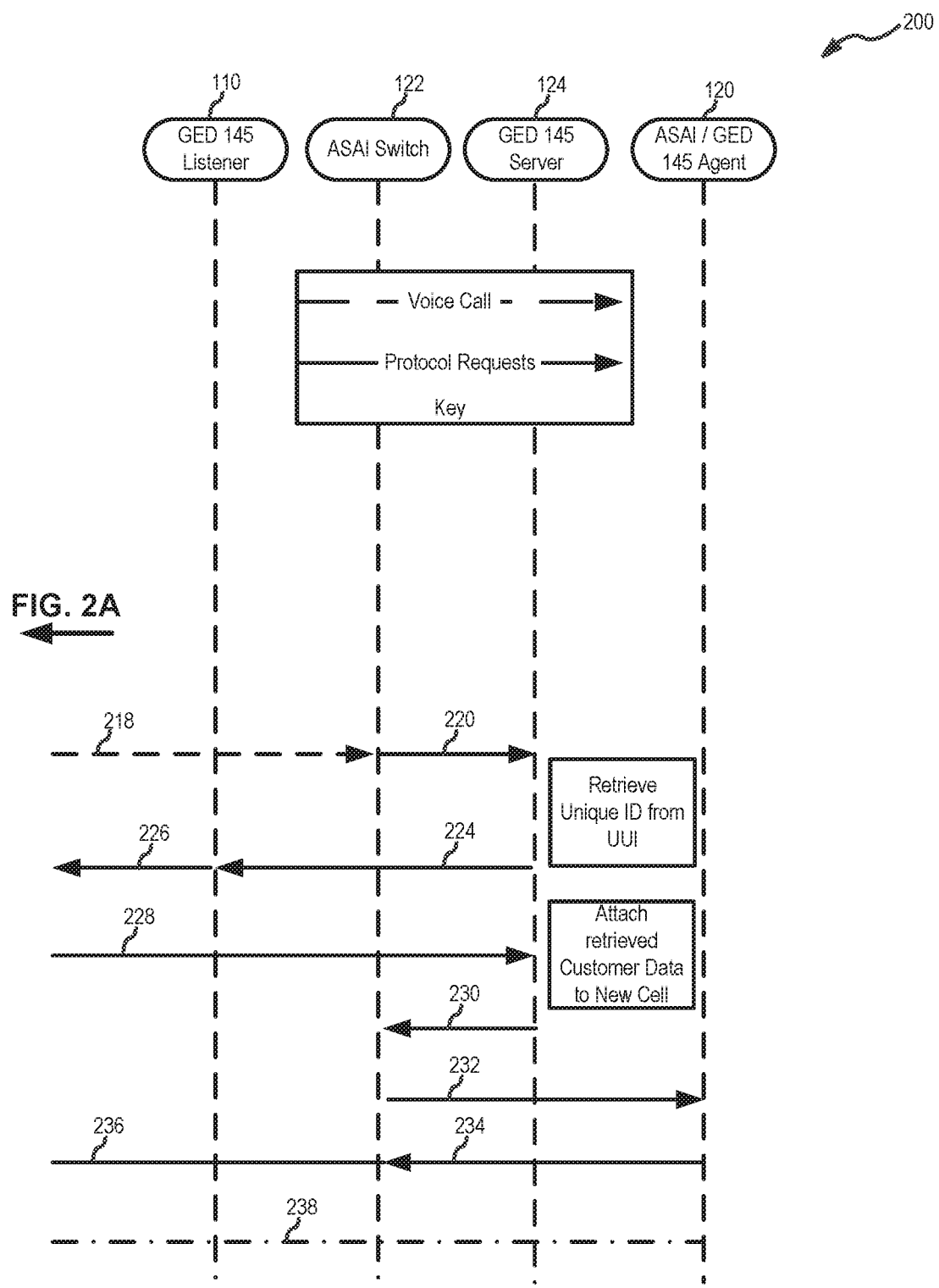
FIG. 2B illustrates a process flow for transferring voice and data communications from a first communications environment to a second communications environment, in accordance with various embodiments

In various embodiments, and with additional reference to FIGS. 1, 2A, and 2B, a process flow 200 for transferring voice and data communications from a first communications environment to a second communications environment is illustrated. A user may access a PSTN via a customer device 108 to establish a voice communication channel (i.e. voice call) (step 202). The PSTN may route the voice call to issuer system 102 which may distribute the call to the first communications environment 104 (step 204). The voice call may arrive at the first communications environment 104 via the first switch module 116 which may route the voice call to the first agent terminal 114 (step 206). In various embodiments, step 206 may include storing data related to the voice call via data translation environment 112 as E1 data 128. The first agent terminal 114 may request a communications transfer from the first communications environment 104 to the second communications environment 106. In various embodiments, the first agent terminal 114 may pass the voice call to the first switch module 116 in response to the request for communications transfer (step 208). In various embodiments, the first communications environment may comprise a first protocol such as, for example, a Session Initiation Protocol (SIP). The first agent terminal 114 and first switch module 116 pass the voice call via SIP.

The first switch module 116 may receive the voice call at a first communications environment transfer point (i.e. a first transfer point such as, for example, a SIP transfer point) and, in response, may request the data translation environment 112 to perform a data translation (step 210). The data translation environment 112 may perform the data translation (step 212). In various embodiments, step 212 may include generating a unique ID and associating the unique ID with the E1 data. Step 212 may include inserting the unique ID into a SIP User to User Information (UUI) header. The data translation environment 112 may store the unique ID and associated E1 data 128 as E3 data 132 (step 214). The data translation environment 112 may determine a second communications environment transfer point (i.e. a second transfer point such as, for example, an Adjunct Switch Application Interface (ASAI) transfer point) and provide the second transfer point to the first switch module 116 (step 216). In response to receiving the second transfer point, the first switch module 116 may execute the transfer request and pass the voice call to the second transfer point (step 218). Step 218 may include passing the SIP UUI header including the inserted unique ID to the second transfer point. For more information regarding the ASAI protocol, see AVAYA MULTI-VANTAGE™ APPLICATION ENABLEMENT SERVICES ASAI PROTOCOL REFERENCE RELEASE 3.1.0, Issue 2, May 2006, available at https://downloads.avaya.com/css/P8/documents/100013744 (last visited January 2019), see also, Avaya, *ASAI Feature*, https://downloads.avaya.com/elmodocs2/AIR/CDV3/AIR%20Doc%20CDnew/html/2396.htm (2003), last visited January 2019, each of which are hereby incorporated by reference in their entirety.

In various embodiments, the second communications environment 106 may receive the voice call from the first transfer point of first switch module 116 at the second transfer point of the second switch module 122. In response to receiving the call, the second switch module 122 may pass a new call request including the UUI to the server module 124 (step 220). Server module 124 may strip the unique ID from the UUI and may transmit a request for customer data including the unique ID to the listening API 110 via the second protocol 126 (step 224). Listening API 110 may pass the request for customer data and the unique ID to the data translation environment 112 via the third protocol 136 (step 226). In response to the request, the data translation environment 112 may return the customer data to the server module 124 (step 228). Step 228 may include comparing the unique ID with the E3 data 132 and returning the E3 data 132 associated with the unique ID. Step 228 may include inserting the E3 data 132 into the new call request to generate a data populated call request and passing the data populated call request to the server module 124.

In various embodiments, the server module 124 may receive the data populated call request and, in response, may generate a data populated new call (step 230). Step 230 may include determining an available agent terminal and generating an assignment request based on the terminal availability. Step 230 may include passing the assignment request and the data populated new call to the second switch module 122. In various embodiments, the second switch module may receive the assignment request and the data populated new call and, in response, pass the data populated new call to the second agent terminal 120 (step 232). In various embodiments, the second agent terminal 120 may receive the data populated new call and, in response, open the voice communications channel with the customer device 108. The second agent terminal 120 may notify the second switch module 122 to open the voice communications channel (step 234). The second switch module 122 may notify the first switch module 116 to switch the voice communications channel from the first switch module 116 to the second switch module 122 (step 236). The first switch module 116 may transfer the voice communication channel to the second switch module 122 and/or the second agent terminal 120 (step 238).

Figure 3A:
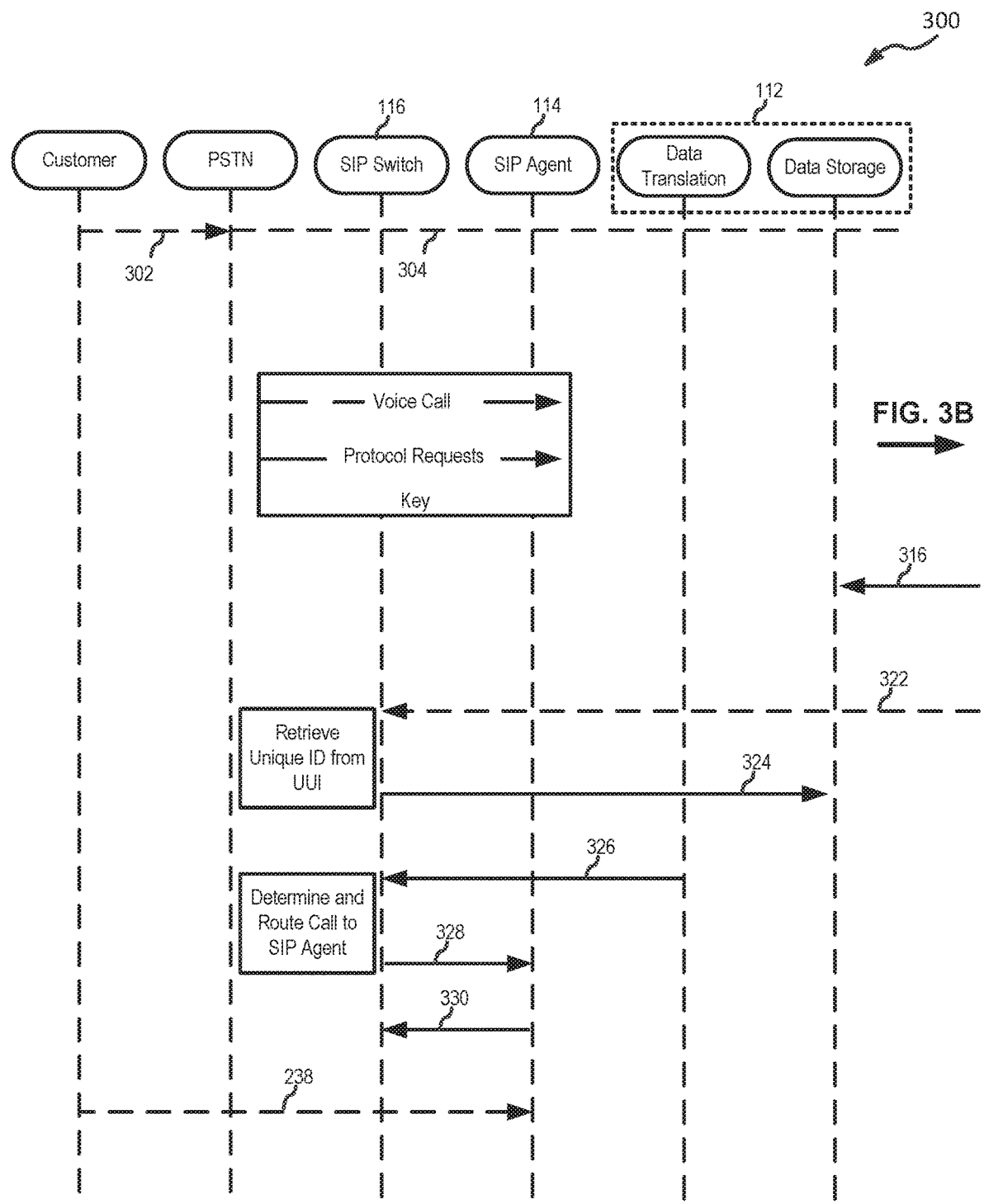
FIG. 3A illustrates a proves flow for transferring voice and data communications from a second communications environment to a first communications environment, in accordance with various embodiments.
Figure 3B:
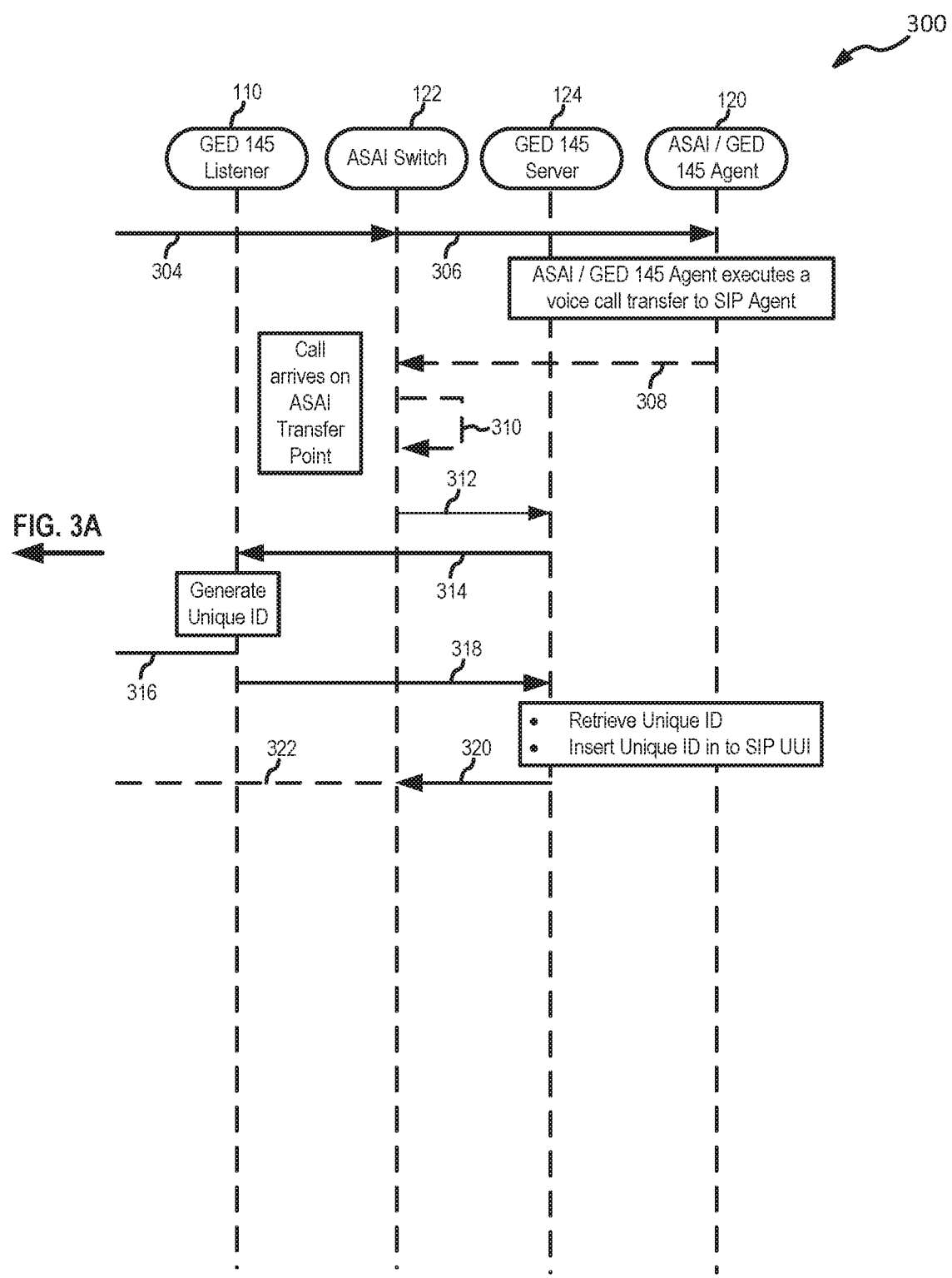
FIG. 3B illustrates a proves flow for transferring voice and data communications from a second communications environment to a first communications environment, in accordance with various embodiments.

In various embodiments, and with additional reference to FIGS. 3A and 3B, a process flow 300 for transferring voice and data communications from a second communications environment to a first communications environment is illustrated. A user may access a PSTN via a customer device 108 to establish a voice communication channel (i.e. voice call) (step 302). The PSTN may route the voice call to issuer system 102 which may distribute the call to the second communications environment 106 (step 304). The voice call may arrive at the second communications environment 106 via the second switch module 122 which may route the voice call to the second agent terminal 120 (step 306). In various embodiments, step 306 may include storing data related to the voice call via data translation environment 112 as E2 data 130. The second agent terminal 120 may request a communications transfer from the second communications environment 106 to the first communications environment 104. In various embodiments, the second agent terminal 120 may pass the voice call to the second switch module 122 in response to the request for communications transfer (step 308). In various embodiments, the second communications environment 106 may comprise a second protocol such as, for example, a ASAI and/or GED-145. The second agent terminal 120 and second switch module 122 may pass the voice call via ASAI.

The second switch module 122 may receive the voice call at a second communications environment transfer point (e.g., an ASAI transfer point) and, in response, may generate a new call request (step 310). The second switch module 122 may send the new call request to the server module 124 (step 312). The server module 124 may receive the new call request and may pass data related to the call to the listening API 110 (step 314). In response to receiving the data related to the call, the listening API 110 may generate a unique ID and pass the unique ID to data translation environment 112 for storage (step 316). Step 316 may include associating the unique ID with the E2 data 130 and storing the associated E2 data 130 as E3 data 132. Listening API 110 may pass the unique ID to the server module 124 (step 318). Server module 124 may instruct the second switch module to route the call to the first communications environment 104 (step 320). Step 320 may include server module 124 inserting the unique ID into a SIP UUI header in response to receiving the unique ID and determining a first communications environment transfer point (i.e. a first transfer point such as, for example, a SIP transfer point). Step 320 may include providing the first transfer point to the second switch module 122. Second switch module 122 may execute the transfer request in response to receiving the first transfer point and route the voice call to the first transfer point of the first switch module 116 (step 322). Step 322 may include passing the SIP UUI header including the inserted unique ID to the first transfer point.

In various embodiments, the first switch module 116 may receive the voice call from the second switch module 122 and strip the unique ID from the UUI header (step 324). Step 324 includes the first switch module 116 passing a request for customer data including the unique ID to the data translation environment 112. In various embodiments, the request for customer data may be passed by first communications environment 104 to the data translation environment 112 via the third protocol 136. In response to the request, the data translation environment 112 may return the customer data to the first switch module 116 (step 326). Step 326 may include comparing the unique ID with the E3 data 132 and returning the E3 data 132 associated with the unique ID. Step 326 may include inserting the E3 data 132 into a new call request to generate a data populated call request and passing the data populated call request to the first switch module 116. Step 326 may include translating the E3 data 132 from a second communications environment format to a first communications environment format.

In various embodiments, the first switch module 116 may receive the data populated call request and assign the call request to the first agent terminal 114 (step 328). Step 328 may include determining an available agent terminal and generating an assignment request based on the terminal availability. In various embodiments, the first agent terminal 114 may receive the data populated new call and, in response, open the voice communications channel with the customer device 108. The first agent terminal 114 may notify the first switch module 116 to open the voice communications channel (step 330). Step 330 may include displaying data from the data populated call request. The first switch module 116 may open the voice communication channel to the first agent terminal 114 (step 332).

Figure 4:
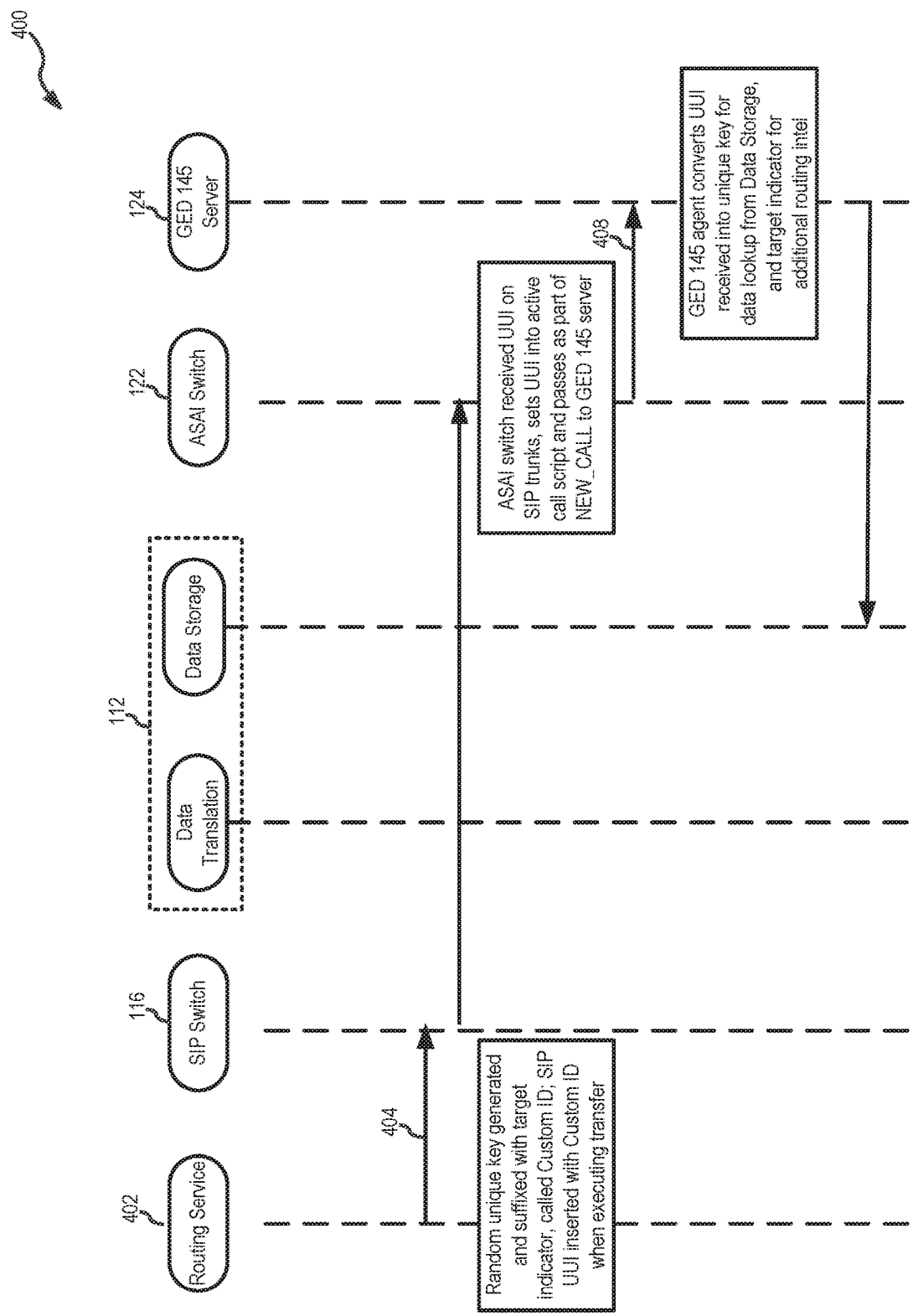
FIG. 4 illustrates a process flow for generating a unique ID between a first communications environment and a second communications environment, in accordance with various embodiments.

In various embodiments, and with additional reference to FIG. 4, a process flow 400 for generating a unique ID between a first communications environment and a second communications environment is illustrated. In various embodiments, the first communications environment 104 may include a routing service 402. Routing service 402 may generate a SIP UUI including the unique ID and pass the SIP UUI to the first switch module 116 (step 404). Routing service 402 may comprise a random number generator. Step 404 may include routing service 402 generating a random number based on the random number generator and suffixing the random number with a SIP target indicator to generate the unique ID. First switch module 116 may pass the SIP UUI to the second switch module 122 (step 406). Step 406 may include inserting the SIP UUI into a new call request.

In various embodiments, the second switch module 122 may receive the SIP UUI and set the SIP UUI into an active call script (step 408). Step 408 may include generating a new call passing the SIP UUI to the server module 124 via the new call. In various embodiments, the server module 124 may receive the new call and may retrieve data from the data translation environment 112 based on the unique ID (step 410). Step 410 may include stripping the unique ID from the SIP UUI. Step 410 may include server module 124 converting the unique ID into the SIP target indicator and the random number. Step 410 may include passing the random number to the data translation environment 112.

Figure 5:
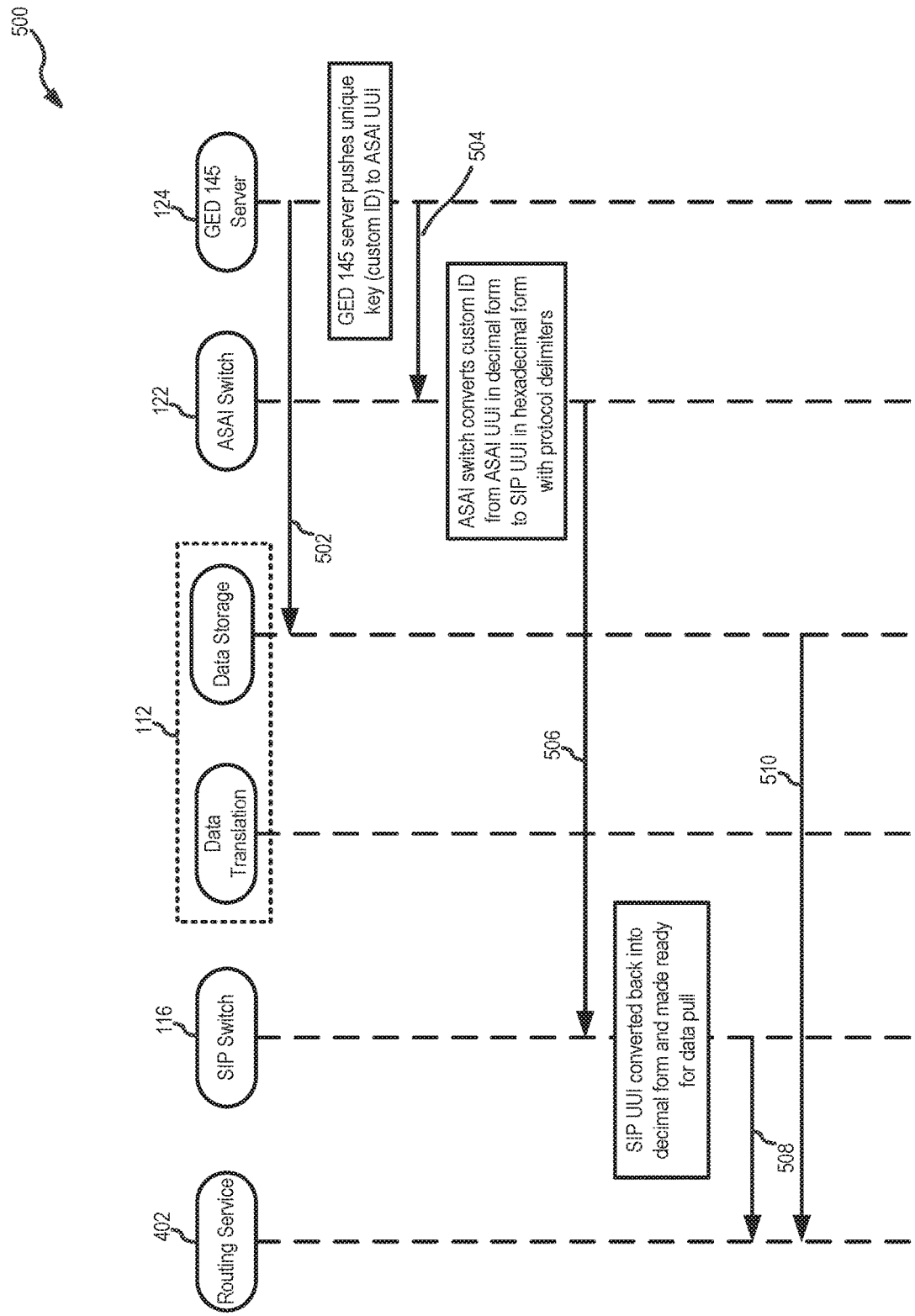
FIG. 5 illustrates a process flow for converting a unique ID between a second communications environment and a first communications environment, in accordance with various embodiments.

In various embodiments, and with additional reference to FIG. 5, a process flow 500 for converting a unique ID between a second communications environment and a first communications environment is illustrated. Server module 124 may pass data related to a call to data translation environment 112 and the data translation environment 112 may return a random number (step 502). Step 502 may include data translation environment 112 generating a random number based on a random number generator. Server module 124 may generate an ASAI UUI including a unique ID based on the random number and may pass the ASAI UUI to the second switch module 122 (step 504). Step 504 may include server module 124 suffixing the random number with an ASAI target indicator to generate the unique ID. Second switch module 122 may pass a SIP UUI comprising the unique ID to the first switch module 116 in response to receiving the ASAI UUI comprising the unique ID (step 506). Step 506 may include second switch module 122 converting the unique ID from an ASAI UUI in decimal form to a SIP UUI in hexadecimal form with delimiters. The first switch module 116 may receive the SIP UUI comprising the unique ID and may pass SIP UUI comprising the unique ID to the routing service 402 (step 508). Step 508 may include first switch module 116 converting the SIP UUI in hexadecimal to a SIP UUI in decimal form. In various embodiments, routing service 402 may strip the unique ID to recover the random number and may pass the random number to the data translation environment 112 (step 510).

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Referring now to FIGS. 2A-5 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2A-5, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS' applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LosmN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   receiving, by a computer-based system, a voice call;
   assigning, by the computer-based system, the voice call to a first communications environment associated with the computer-based system;
   storing, by the computer-based system, call related data from the first communications environment in a data translation environment accessible to both the first communications environment and a second communications environment, wherein the data translation environment is configured to generate one or more data links between one or more data records stored in the data translation environment and one or more unique session identifiers;
   receiving, by the computer-based system, a request for communications transfer from the first communications environment;
   transferring, by the computer-based system, the voice call from the first communications environment to a second communications environment associated with the computer-based system, in response to the request for the communications transfer; and
   passing, by the computer-based system, the call related data from the first communications environment to the second communications environment.

2. The method of claim 1, further comprising:
   generating, by the computer-based system, a particular unique ID in response to the request for communications transfer from the first communications environment to the second communications environment;
   associating, by the computer-based system, the particular unique ID with the call related data to generate an associated data; and
   passing, by the computer-based system, the particular unique ID from the first communications environment to the second communications environment.

3. The method of claim 2, further comprising:
   inserting, by the computer-based system, the particular unique ID into a user to user information header;
   passing, by the computer-based system, the user to user information header from the first communications environment to the second communications environment;
   stripping, by the computer-based system, the particular unique ID from the user to user information header; and
   recalling, by the computer-based system, the associated data based on the particular unique ID.

4. The method of claim 3, further comprising:
   generating, by the computer-based system, a data populated call request based on the associated data;
   assigning, by the computer-based system, the data populated call request to an agent terminal of the second communications environment; and
   displaying, by the computer-based system, a data of the data populated call request via the agent terminal.

5. The method of claim 3, wherein the first communications environment is configured to pass the user to user information via a first protocol, and wherein the second communications environment is configured to pass the user to user information via a second protocol.

6. The method of claim 5, further comprising:
suffixing, by the computer-based system, a random number with a target indicator to generate the particular unique ID; and
converting, by the computer-based system, the user to user information from the second protocol in decimal form to the first protocol in hexadecimal form with delimiters.

7. The method of claim 6, wherein the first protocol is a session initiation protocol, and wherein the second protocol is at least one of an adjunct switch application interface protocol or a GED-145 protocol.

8. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, a voice call;
assigning, by the processor, the voice call to a first communications environment;
storing, by the processor, call related data from the first communications environment in a data translation environment accessible to both the first communications environment and a second communications environment, wherein the data translation environment is configured to generate one or more data links between one or more data records stored in the data translation environment and one or more unique session identifiers;
receiving, by the processor, a request for communications transfer from the first communications environment;
transferring, by the processor, the voice call from the first communications environment to a second communications environment, in response to the request for the communications transfer; and
passing, by the processor, the call related data from the first communications environment to the second communications environment.

9. The system of claim 8, wherein, when executed, the instructions further cause the processor to perform operations comprising:
generating, by the processor, a particular unique ID in response to the request for communications transfer from the first communications environment to the second communications environment;
associating, by the processor, the particular unique ID with the call related data to generate an associated data; and
passing, by the processor, the particular unique ID from the first communications environment to the second communications environment.

10. The system of claim 9, wherein, when executed, the instructions further cause the processor to perform operations comprising:
inserting, by the processor, the particular unique ID into a user to user information header;
passing, by the processor, the user to user information header from the first communications environment to the second communications environment;
stripping, by the processor, the particular unique ID from the user to user information header; and
recalling, by the processor, the associated data based on the particular unique ID.

11. The system of claim 10, wherein, when executed, the instructions further cause the processor to perform operations comprising:
generating, by the processor, a data populated call request based on the associated data;
assigning, by the processor, the data populated call request to an agent terminal of the second communications environment; and
displaying, by the processor, a data of the data populated call request via the agent terminal.

12. The system of claim 10, wherein the first communications environment is configured to pass the user to user information via a first protocol, and wherein the second communications environment is configured to pass the user to user information via a second protocol.

13. The system of claim 12, wherein, when executed, the instructions further cause the processor to perform operations comprising:
suffixing, by the processor, a random number with a target indicator to generate the particular unique ID; and
converting, by the processor, the user to user information from the second protocol in decimal form to the first protocol in hexadecimal form with delimiters.

14. The system of claim 13, wherein the first protocol is a session initiation protocol and wherein the second protocol is at least one of an adjunct switch application interface protocol or a GED-145 protocol.

15. An article of manufacture including a non-transitory, tangible computer readable storage medium having instructions stored thereon that, in response to execution by a computer-based system, cause the computer-based system to perform operations comprising:
receiving, by the computer-based system, a voice call;
assigning, by the computer-based system, the voice call to a first communications environment;
storing, by the computer-based system, a call related data from the first communications environment in a data translation environment accessible to both the first communications environment and a second communications environment, wherein the data translation environment is configured to generate one or more data links between one or more data records stored in the data translation environment and one or more unique session identifiers;
receiving, by the computer-based system, a request for communications transfer;
transferring, by the computer-based system, the voice call from the first communications environment to a second communications environment, in response to the request for the communications transfer; and
passing, by the computer-based system, the call related data from the first communications environment to the second communications environment.

16. The article of manufacture of claim 15, wherein the operations further comprise:
generating, by the computer-based system, a particular unique ID in response to the request for communications transfer from the first communications environment to the second communications environment;
associating, by the computer-based system, the particular unique ID with the call related data to generate an associated data; and passing, by the computer-based system, the particular unique ID from the first communications environment to the second communications environment.

17. The article of manufacture of claim 16, wherein the operations further comprise:
   inserting, by the computer-based system, the particular unique ID into a user to user information header;
   passing, by the computer-based system, the user to user information header from the first communications environment to the second communications environment;
   stripping, by the computer-based system, the particular unique ID from the user to user information header; and
   recalling, by the computer-based system, the associated data based on the particular unique ID.

18. The article of manufacture of claim 17, wherein the operations further comprise:
   generating, by the computer-based system, a data populated call request based on the associated data;
   assigning, by the computer-based system, the data populated call request to an agent terminal of the second communications environment; and
   displaying, by the computer-based system, a data of the data populated call request via the agent terminal.

19. The article of manufacture of claim 17, wherein the first communications environment is configured to pass the user to user information via a first protocol, and wherein the second communications environment is configured to pass the user to user information via a second protocol.

20. The article of manufacture of claim 19, wherein the operations further comprise:
   suffixing, by the computer-based system, a random number with a target indicator to generate the particular unique ID; and
   converting, by the computer-based system, the user to user information from the second protocol in decimal form to the first protocol in hexadecimal form with delimiters.

* * * * *